United States Patent
Simeti

[11] 3,991,505
[45] Nov. 16, 1976

[54] FISHING SPREADER CONNECTOR AND COMBINATION THEREOF

[76] Inventor: Samuel Simeti, 228 N. Poplar St., North Massapequa, N.Y. 11758

[22] Filed: Nov. 3, 1975

[21] Appl. No.: 627,494

[52] U.S. Cl. .............................. 43/42.74; 43/43.12; 24/201 TR
[51] Int. Cl.² ........................................ A01K 91/00
[58] Field of Search ....................... 43/42.74, 43.12; 24/115 F, 201 TR

[56] References Cited
UNITED STATES PATENTS

| | | | |
|---|---|---|---|
| 2,157,003 | 5/1939 | Mussina | 43/42.74 |
| 2,733,537 | 2/1956 | Elsberg | 43/43.12 |
| 2,907,134 | 10/1959 | Trautvetter | 43/43.12 |
| 2,935,810 | 5/1960 | Giguere | 43/42.74 |

Primary Examiner—Louis G. Mancene
Assistant Examiner—Daniel J. Leach
Attorney, Agent, or Firm—Nolte and Nolte

[57] ABSTRACT

A plastic fishing connector for connecting a fishing line, hook spreader and sinker and which is adapted for quick assembly to the spreader, is easily and inexpensively fabricated, is attractive, provides release of the sinker and of the fishing line under snag conditions; as well as a spreader and a connector - spreader combination construction of simple design.

8 Claims, 6 Drawing Figures

FISHING SPREADER CONNECTOR AND COMBINATION THEREOF

THE PRIOR ART

Hook spreaders of the prior art are normally made of quarter hard brass rod and provide arms extending from a central connector eye to outer hook eyes, the eyes being formed as double turned coils. A line-sinker connector of the prior art similarly provides a brass rod or wire turned into assembly with the central connector eye of the spreader to provide a further eye for connection to the fishing line and a "safety-pin" type loop for connecting the sinker and for releasing the sinker under snag conditions. Beads strung on the connector during assembly, and which act to prevent the connector from passing through the central eye of the spreader are provided on either side of the central connector eye on the spreader.

THE INVENTION AND ITS OBJECTS

The invention inasmuch as it concerns the connector per se, may be used with prior art spreaders. However, in an embodiment of the invention, the brass wire spreader is formed differently to eliminate double coiling of the central eye and is formed in a single turn, not quite a revolution, but so as to have the arms of the spreader extend to the hook eyes from the horizontal legs of the Omega ($\Omega$) shape forming in the spreader central connector eye.

In one embodiment of the invention, the connector and spreader are both fabricated of plastic material, the connector preferably of polypropylene as it is adaptable for providing strength as well as resilience and stress characteristics under snag conditions whereby the connector will release the sinker and ultimately the fishing line although normally only the sinker need be released. The spreader is preferably made of nylon for strength and bendability.

In any event, the connector of the invention is a molded piece providing a central portion having an aperture for a fastener such as a swaged rivet or plastic peg, heat distorted at the ends, for instance, or the like, for fastening the connector to the central eye of the spreader. A sinker loop is integrally molded with the central portion at one end and is provided with a locking boss at the other free end for releasable latching with a catch element which is also integrally molded with the central portion. The catch element is in the form of an inverted U with one leg thereof extending integrally from the central portion and the other leg extending downwardly but short of the central portion to provide entry of the free end of the sinker loop therebeneath to dispose the boss in compressed relationship with the inner edge of the web of the U shaped catch element. A feature of the catch element is that there is a cut-out portion forming a downwardly facing ramp along the free leg extending toward the arc of the loop to facilitate easy entry and exit of the free end of the loop for connecting and changing sinkers.

A fishing line loop of similar design may also be provided to connect the usual swivel which is tied to the fishing line.

The sinker loop is advantageously larger than the line loop to distinguish the two loops as the release mechanism of the sinker loop, i.e. the locking boss is smaller in diameter and height than the same release mechanism of the line loop so that release of the sinker under snag conditions without loss of the spreader and hooks is more likely.

Thus, there is provided a single molded plastic piece which is readily attached to the central eye of a spreader by rivet connection thereby eliminating expensive manufacturing techniques developed because of the use of the prior art brass rod.

The invention and its objects will be better understood by referring to the following specifications taken in conjunction with the accompanying drawings in which.

Figure 1:
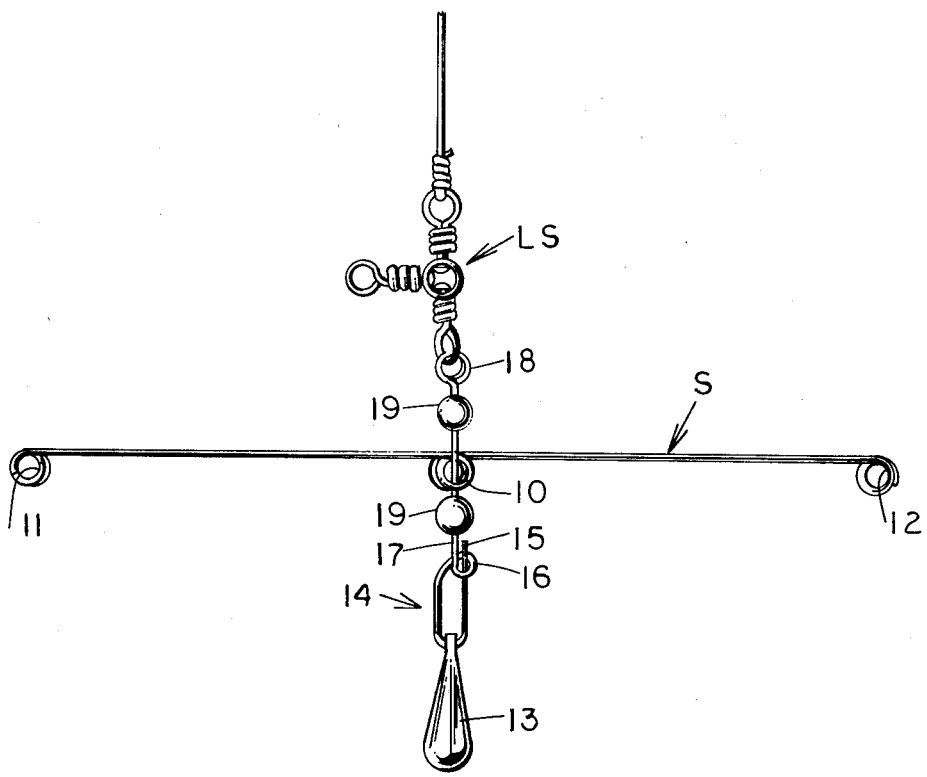
FIG. 1 is a plan view of a combination spreader and line-sinker connector of the prior art.

Referring now to FIG. 1, a combination spreader and connector of the prior art is disclosed. The prior art spreader S is comprised of a single length of turned quarter hard brass rod with a central connector eye 10 formed from a double coiling of the rod and with arms extending outwardly on either side thereof to fish hook connector eyes 11, 12 also formed from double coilings of the brass rod. A sinker 13 is threaded onto a connector 14 which provides the usual safety pin construction for releasably securing the end 15 of the sinker loop within a turned catch 16 thereof. An arm 17 extends from the catch through the central connector eye 10 of the spreader to the other side thereof where a line connector eye 18 is formed also by turning and which must during fabrication or thereafter accommodate the usual line swivel LS which connects the line of the fishing rod. Retainer beads 19, strung on arm 17 are disposed on either side of the central connector eye of the spreader.

Under snag conditions the free end 15 of the sinker loop is pulled from the catch turn 16 to permit release of the snagged sinker 13.

Thus, the prior art discloses a relatively expensive and complicated brass rod turning fabrication operation of two elements, the spreader and the connector, and again a relatively expensive and complicated assembly operation. Further, the connection between the swivel and connector is also a difficult operation.

Figure 2:
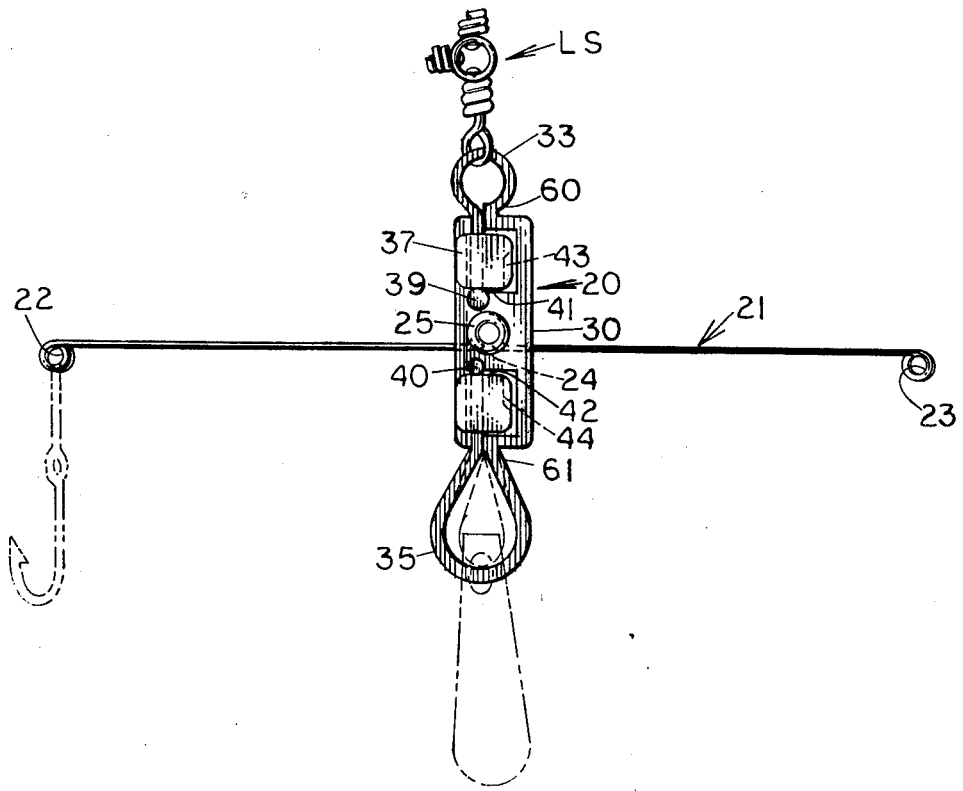
FIG. 2 is a plan view of the connector of the invention in combination with a brass spreader modified to provide a simpler central connector eye construction more adaptable for rivet connection of the spreader and connector, and showing in phantom an extended condition of the sinker hook.

In contradistinction thereto, the present invention as shown in one preferred embodiment thereof in FIG. 2 provides a single piece molded connector 20 riveted to a brass rod connector 21 which is basically the same as the brass rod connector of the prior art, providing hook connector eyes 22 and 23 but which has a modified central connector eye 24 in the form of an Omega to provide an aligned circular area of wire, rather than coiled, for better reception of rivet 25 at its swaged end, not shown, and for flat alignment of the juxtaposed surfaces of the spreader eye and connector 20.

It should be understood, however, that the spreader of the prior art could also be used with the connector 20. This would require a longer rivet.

Figure 4:
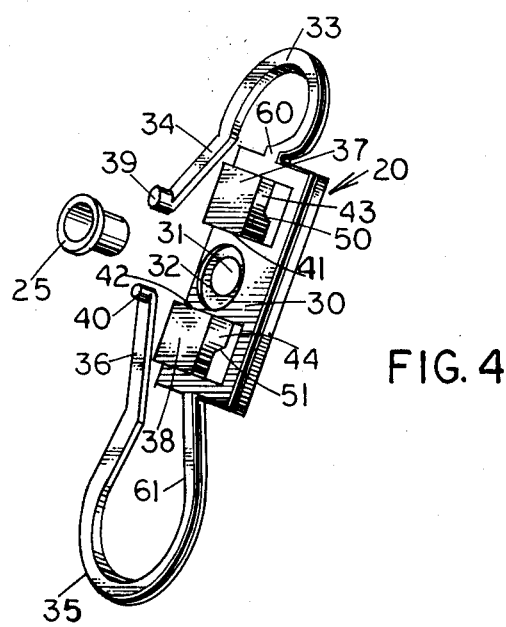
FIG. 4 is a perspective view of the connector of the invention prior to attachment to the spreader and prior to disposal of the free ends of the sinker and line loops latching engagement with the catch elements.

In any event, the connector 20 as best seen in FIG. 4 where it is depicted in the opened position and unconnected to a spreader provides a central body portion 30 of generally rectangular shape having a rivet hole 31 disposed centrally thereof providing on the upper surface of the central body portion a recessed area 32 above and around the periphery of the hole 31 so that when the rivet 25 attaches the connector to the spreader the top of the rivet will be out of the way of the free ends 34 and 36 of the line loop 33 and sinker loop 35 after they are manually directed over catch elements 37 and 38 respectively and while they are directed under the catch elements to dispose line loop boss 39 and sinker loop boss 40 to their latched position against inner edges 41 and 42 respectively of the catch elements. Boss 39 is of larger diameter and longer than boss 40. The reasons for the differences will be explained. The connector, as molded, provides a resilient biasing of the ends upwardly of the body portion and laterally in the direction of the integral legs of the catch elements. This biasing assists in maintaining the loop ends captive under the catch elements with the bosses contacting the inner edges thereof.

Each of the catch elements extends from one side of the central body portion upwardly than laterally across the central body portion toward the other side thereof and thence downwardly to terminate in spaced relation to the body portion thus providing entry and exit of the free ends 34 and 36 of the loops. The downwardly extending free ends 43, 44 of the catch elements are shaped to provide cut-out areas ending in ramps 50, 51. The cut-out areas provide entry of the loop ends beneath the free ends and the ramps cooperate with the loop ends which lift the catch elements slightly as the ends are passed thereunder to dispose the bosses 39, 40 centrally of the inner edges of the catch elements which then snap back down into normal position to dispose the inner ends of the lower portions of the downwardly extending free ends of the catch elements below the upper surfaces of the loop ends 34 and 36 to thus capture the same.

In order to centralize stress forces acting upon the connector along the axis of the connector, that is, along the long axis of the central body portion, the integral end 60 of the line loop extends outwardly from the central body portion along an extension of the axis thereof. While the integral end 61 of the sinker loop extends at an acute angle away from the central body axis to advantageously provide a larger identifying loop for the sinker, when the connector is in tension (shown in phantom in FIG. 2) the sinker loop stretches and tends to align with the axis of the central body portion. Upon an extreme snag condition involving the sinker and because of the provision of the relatively small diameter and height of the boss 40, the end 36 of the sinker loop and the boss 40 bend beneath the catch element 38 and snaps thereunder in the direction of snag tension, thereby permitting release of the snagged sinker.

The connector of the invention may be designed for snap release of the sinker loop end at about 9 pounds of pulling force.

Because of the provision of a boss of larger diameter and height for the line loop, a much greater force will be required before the same snap release of the line loop end will be permitted to thereby release the line.

Figure 6:
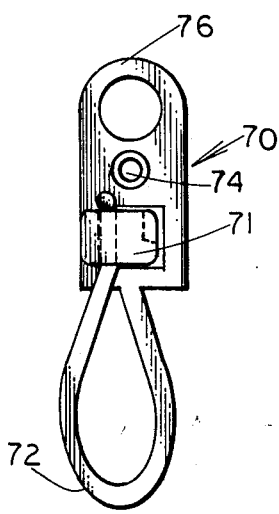
FIG. 6 is a plan view of a further modification of the connector of the invention.

In FIG. 6 there is shown a modification of the connector of the invention providing a central body portion 70, catch portion 71, and sinker loop 72 substantially as provided in the embodiment of the invention previously described. A rivet hole 74 is similarly provided. Instead of providing a releasable line loop, a closed loop 76 is integrally formed with the body.

In either modification, it is noted that in the central body portion, open areas below the catch elements result from accommodating the molding of the piece.

Figure 3:
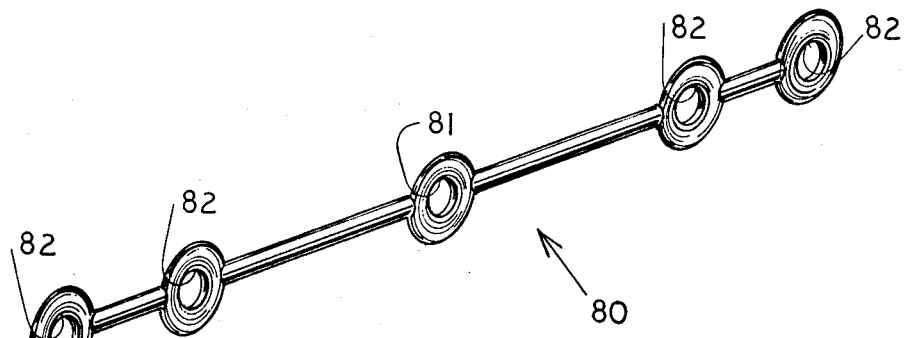
FIG. 3 is a perspective view of a plastic spreader more suitable for the combination spreader-connector of the invention.

FIG. 3 shows a very good spreader 80 for use in the combination spreader and connector of the invention. This spreader 80 is molded of nylon providing strength and resiliency and provides a central eye 81 for connection with a connector 20 or 70 and multiple eyes 82 for hook connections. The cross section of spreader 80 may be round as shown, or rectangular or "X" shaped, etc.

Figure 5:
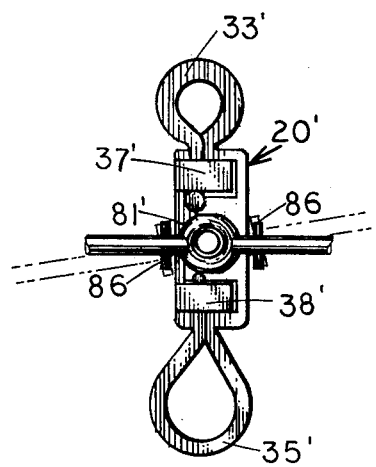
FIG. 5 is a plan view of a modification of the connector-spreader combination of the invention.

FIG. 5 depicts another modification of the invention in which the catch 37', 38', and loop 33', 35' elements of the connector 20' are spaced apart a larger distance so that between the sinker and line loops there is provided sufficient space for the eye of the spreader 80' to be disposed on the "upper" surface of the central body portion of the connector thus dispensing with the necessity of providing any recessed area to keep the rivet head away from the path of travel of the loop ends. This modification has a further advantage in that the spreader arms when pivoting about the rivet (shown in phantom) may be prevented from overcanting by contact between stops 86, integrally molded with the spreader arms, and the sides of the connector 20'. Even without stops 86, pivoting of the spreader may be stopped by the catch elements to prevent excessive movements of the hooks. The outer periphery of the central eye connector 81' may be round as shown on FIG. 3 or flattened at the upper and lower portions thereof to perhaps provide additional stop surfaces along with the arms of the spreader for preventing excessive circular movement of the spreader about the rivet connection.

Many modifications of the invention will occur to those as skilled in the art, for instance, a single piece connector and spreader may be fabricated without departing from the spirit of the inventions disclosed herein.

In all events the invention is as now claimed.

What is claimed is:

1. A plastic fishing connector comprising a body portion, loop means for securing a sinker, said loop means having one end thereof integral with said body portion and extending outwardly therefrom and a free end including an upstanding boss at the terminal portion thereof, catch means for latching the free end of said loop means, said catch means having an upstanding side formed integrally with said body portion, a web extending from said integrally formed side across said body portion and another side extending downwardly from said web toward said body portion but short thereof thereby providing entry and exit for said free end of said loop means between said body portion and said other end of said catch means, said catch means presenting inner and outer edges of said web, said loop means being biased so that in the open position said free end extends outwardly of said web and said catch side which is integrally formed with said body portion; the arrangement being such that said catch means constitutes means for receiving said free end of said loop means beneath said web and between said sides with said boss adjacent said inner edge when said loop means is in the closed latched position, and said catch and said free end of said loop constitute means for releasing the latter beneath the web of the former when the sinker is snagged.

2. The connector of claim 1 further comprising second loop means extending from said body portion for connecting a fishing line or end element thereof and includng one end integrally formed with said central body portion and a free end formed with a boss at the extremity thereof, said boss being larger than said boss on the extremity of said first mentioned loop means, second catch means formed as said first mentioned catch means and comprising means for latching said free end of said second loop means.

3. The connector of claim 1 wherein said body portion provides aperture means for receiving attachment means for securing said connector to a hook spreader.

4. The connector of claim 3 wherein said body portion provides a recess above the periphery of the said aperture means for disposing the surfaces of attachment means below the surface of said body portion and out of the way of the path of movement of said free end of said loop means.

5. The connector of claim 3 in combination with a spreader providng a central eye, said eye being formed in parallel planes for flat juxtaposition with said connector, and attachment means extending through said aperture means of said body and said eye are provided for attaching said connector and spreader in assembly.

6. The connector of claim 2 wherein said sinker loop is larger than said fishing line loop thus constituting means for identifying the loops.

7. The connector of claim 3 in combination with a spreader in which stop means are provided between said connector and said spreader for preventing relative over-rotational movement therebetween.

8. A plastic fishing connector comprising a body portion, loop means for securing a sinker, said loop means having one end thereof integral with said body portion and extending outwardly therefrom and a free end including an upstanding boss at the terminal portion thereof, catch means for latching the free end of said loop means, said catch means being formed integrally with said body portion and with a free end extending downwardly toward said body portion but short thereof, thereby providing entry and exit for said free end of said loop means between said body portion and said free end of said catch means, said catch means presenting inner and outer edges, the arrangement being such that said catch means constitutes means for receiving said free end of said loop means therebeneath with said boss adjacent said inner edge when said loop means is in the closed latched position, and said catch and said free end of said loop constitute means for releasing the latter from beneath said catch means when the sinker is snagged.

* * * * *